(12) United States Patent
Lu et al.

(10) Patent No.: US 10,579,646 B2
(45) Date of Patent: *Mar. 3, 2020

(54) SYSTEMS AND METHODS FOR CLASSIFYING ELECTRONIC DOCUMENTS

(71) Applicant: TSG Technologies, LLC, St. Louis, MO (US)

(72) Inventors: Caimei Lu, Kirkwood, MO (US); Ricky John Prosser, St. Charles, MO (US); Michael Wayne Bryars, Chesterfield, MO (US)

(73) Assignee: TSG Technologies, LLC, St. Louis, MO (US)

( * ) Notice: Subject to any disclaimer, the term of this patent is extended or adjusted under 35 U.S.C. 154(b) by 421 days.

This patent is subject to a terminal disclaimer.

(21) Appl. No.: 15/629,332

(22) Filed: Jun. 21, 2017

(65) Prior Publication Data

US 2017/0286524 A1    Oct. 5, 2017

Related U.S. Application Data

(63) Continuation of application No. 15/069,661, filed on Mar. 14, 2016, now Pat. No. 9,710,540, which is a continuation of application No. 13/839,817, filed on Mar. 15, 2013, now Pat. No. 9,298,814.

(51) Int. Cl.
*G06F 16/28* (2019.01)
*G06F 16/245* (2019.01)
*G06F 16/35* (2019.01)
*G06F 16/9535* (2019.01)

(52) U.S. Cl.
CPC .......... *G06F 16/285* (2019.01); *G06F 16/245* (2019.01); *G06F 16/353* (2019.01); *G06F 16/9535* (2019.01)

(58) Field of Classification Search
USPC ....................................................... 707/738
See application file for complete search history.

(56) References Cited

U.S. PATENT DOCUMENTS

| 4,930,077 | A | 5/1990 | Fan |
| 5,220,219 | A | 6/1993 | Barber |
| 5,371,673 | A | 12/1994 | Fan |
| 6,233,575 | B1 | 5/2001 | Agrawal et al. |

(Continued)

OTHER PUBLICATIONS

Blei D.M., Ng A.Y., and Jordan M.I., "Latent Dirichlet Allocation" in Journal of Machine Learning Research, 2003 (3), pp. 993-1022.

(Continued)

*Primary Examiner* — Cam Linh T Nguyen
(74) *Attorney, Agent, or Firm* — Polsinelli PC

(57) ABSTRACT

A method of classifying an electronic document from an electronic media source includes generating statistical data from one or more training documents and creating a plurality of classification rules, including creating at least one topic model-based classification rule using the statistical data and creating at least one query-based classification rule using one or more user defined categories and the statistical data. The method further includes classifying the electronic document using the at least one topic model-based classification rule. Example systems for classifying an electronic document from an electronic media source are also disclosed.

20 Claims, 9 Drawing Sheets

(56) References Cited

U.S. PATENT DOCUMENTS

| | | |
|---|---|---|
| 6,236,991 B1 | 5/2001 | Frauenhofer et al. |
| 6,253,169 B1 | 6/2001 | Apte et al. |
| 6,583,794 B1 | 6/2003 | Wattenberg |
| 6,584,470 B2 | 6/2003 | Veale |
| 6,615,208 B1 | 9/2003 | Behrens et al. |
| 6,621,930 B1 | 9/2003 | Smadja |
| 6,678,679 B1 | 1/2004 | Bradford |
| 6,886,010 B2 | 4/2005 | Kostoff et al. |
| 6,938,046 B2 | 8/2005 | Cooke et al. |
| 6,954,750 B2 | 10/2005 | Bradford |
| 7,024,407 B2 | 4/2006 | Bradford |
| 7,082,427 B1 | 7/2006 | Seibel et al. |
| 7,113,943 B2 | 9/2006 | Bradford et al. |
| 7,130,777 B2 | 10/2006 | Gard et al. |
| 7,152,056 B2 | 12/2006 | Snyder |
| 7,185,065 B1 | 2/2007 | Holtzman et al. |
| 7,188,078 B2 | 3/2007 | Arnett et al. |
| 7,188,079 B2 | 3/2007 | Arnett et al. |
| 7,197,470 B1 | 3/2007 | Arnett et al. |
| 7,363,243 B2 | 4/2008 | Arnett et al. |
| 7,406,466 B2 | 7/2008 | Roy et al. |
| 7,415,462 B2 | 8/2008 | Bradford |
| 7,428,505 B1 | 9/2008 | Levy et al. |
| 7,469,240 B2 * | 12/2008 | Tsukamoto ............ G06F 16/353 706/48 |
| 7,475,069 B2 | 1/2009 | Blackman et al. |
| 7,509,299 B2 | 3/2009 | Liu et al. |
| 7,523,085 B2 | 4/2009 | Nigam et al. |
| 7,562,304 B2 | 7/2009 | Dixon et al. |
| 7,580,910 B2 | 8/2009 | Price |
| 7,596,552 B2 | 9/2009 | Levy et al. |
| 7,599,938 B1 | 10/2009 | Harrison, Jr. |
| 7,600,017 B2 | 10/2009 | Holtzman et al. |
| 7,660,783 B2 | 2/2010 | Reed |
| 7,698,333 B2 | 4/2010 | Cipollone |
| 7,720,792 B2 | 5/2010 | Price |
| 7,720,835 B2 | 5/2010 | Ward et al. |
| 7,725,414 B2 | 5/2010 | Nigam et al. |
| 7,765,098 B2 | 7/2010 | Bradford |
| 7,769,740 B2 | 8/2010 | Martinez et al. |
| 7,822,620 B2 | 10/2010 | Dixon et al. |
| 7,836,083 B2 | 11/2010 | Cipollone |
| 7,844,483 B2 | 11/2010 | Arnett et al. |
| 7,844,484 B2 | 11/2010 | Arnett et al. |
| 7,844,566 B2 | 11/2010 | Wnek |
| 7,865,354 B2 | 1/2011 | Chitrapura et al. |
| 7,865,394 B1 | 1/2011 | Calloway et al. |
| 7,877,345 B2 | 1/2011 | Nigam et al. |
| 7,895,212 B2 | 2/2011 | Skubacz et al. |
| 8,024,344 B2 | 9/2011 | Bradford |
| 8,041,669 B2 | 10/2011 | Nigam et al. |
| 8,117,106 B2 | 2/2012 | Gonen |
| 8,266,148 B2 | 9/2012 | Guha et al. |
| 8,271,316 B2 | 9/2012 | Blackshaw et al. |
| 8,312,276 B2 | 11/2012 | Chiou et al. |
| 8,364,667 B2 | 1/2013 | Chen |
| 8,376,856 B2 | 2/2013 | Kawanaka et al. |
| 8,429,011 B2 | 4/2013 | Newton et al. |
| 8,458,154 B2 | 6/2013 | Eden et al. |
| 8,577,823 B1 * | 11/2013 | Gadir ............... H04L 29/08072 706/45 |
| 8,682,723 B2 | 3/2014 | Parsons et al. |
| 8,745,091 B2 * | 6/2014 | McHenry ............... G06Q 10/10 707/791 |
| 8,751,424 B1 | 6/2014 | Wojcik et al. |
| 8,874,581 B2 | 10/2014 | Shi et al. |
| 2002/0022956 A1 | 2/2002 | Ukrainczyk et al. |
| 2003/0182583 A1 * | 9/2003 | Turco ................. G06F 21/6227 |
| 2004/0019601 A1 | 1/2004 | Gates |
| 2005/0052998 A1 | 3/2005 | Oliver et al. |
| 2005/0060288 A1 | 3/2005 | Von Groll |
| 2005/0060643 A1 | 3/2005 | Glass et al. |
| 2005/0108200 A1 | 5/2005 | Meik et al. |
| 2005/0131935 A1 * | 6/2005 | O'Leary ............... G06F 16/313 |
| 2006/0041604 A1 * | 2/2006 | Peh ......................... G06F 16/38 |
| 2006/0136467 A1 | 6/2006 | Avinash et al. |
| 2006/0210052 A1 * | 9/2006 | Yamanaka .......... H04M 3/5233 379/265.06 |
| 2006/0287989 A1 | 12/2006 | Glance |
| 2008/0114755 A1 | 5/2008 | Wolters et al. |
| 2008/0222563 A1 | 9/2008 | Prinsky |
| 2008/0301055 A1 | 12/2008 | Borgs et al. |
| 2009/0048904 A1 | 2/2009 | Newton et al. |
| 2009/0070683 A1 | 3/2009 | Ward et al. |
| 2009/0106697 A1 | 4/2009 | Ward et al. |
| 2009/0125382 A1 | 5/2009 | Delepet |
| 2009/0132264 A1 | 5/2009 | Wood et al. |
| 2009/0157668 A1 | 6/2009 | Newton et al. |
| 2009/0204482 A1 | 8/2009 | Reshef et al. |
| 2009/0281851 A1 | 11/2009 | Newton et al. |
| 2010/0106557 A1 | 4/2010 | Buss |
| 2010/0114690 A1 | 5/2010 | Steelberg et al. |
| 2010/0205168 A1 | 8/2010 | Yang et al. |
| 2010/0205663 A1 | 8/2010 | Ward et al. |
| 2010/0228593 A1 | 9/2010 | Belwadi et al. |
| 2010/0275128 A1 | 10/2010 | Ward et al. |
| 2012/0109960 A1 | 5/2012 | Mishina et al. |
| 2012/0158724 A1 * | 6/2012 | Mahadevan .......... G06F 16/954 707/737 |
| 2012/0203752 A1 | 8/2012 | Ha-Thuc et al. |
| 2013/0275433 A1 | 10/2013 | Shibata et al. |
| 2013/0311474 A1 | 11/2013 | Emmanuel |
| 2014/0149409 A1 * | 5/2014 | Lamba ................... G06N 5/046 707/737 |

OTHER PUBLICATIONS

Deerwester S., Dumais S., Furnas G., Landauer T., and Harshman R., "Indexing by Latent Semantic Analysis" in Journal of the American Society of Information Science, 1990, 41(6), pp. 391-407.

Hofmann T., "Probabilistic Latent Semantic Indexing" in Proceedings of the Twenty-Second Annual International SIGIR Conference, 1999, pp. 51-57.

Newman D., Chemudugunta C., and Smyth P., "Statistical Entity-Topic Models" in the 12th ACM SIGKDD international conference on Knowledge discovery and data mining, ACM Philadelphia, PA, 2006.

Teh, Y. W.; Jordan, M. I.; Beal, M. J.; Blei, D. M., "Hierarchical Dirichlet Processes" in Journal of the American Statistical Association 101, 2006, pp. 1566-1581.

Non-Final Rejection for U.S. Appl. No. 15/069,661 dated Dec. 12, 2016.

Non-Final Rejection for U.S. Appl. No. 13/839,817 dated Dec. 14, 2014.

Final Rejection for U.S. Appl. No. 13/839,817 dated Jul. 23, 2015.

Notice of Allowance for U.S. Appl. No. 15/069,661 dated Apr. 6, 2017.

Notice of Allowance for U.S. Appl. No. 13/839,817 dated Nov. 20, 2015.

* cited by examiner

| Topic 1 | Topic 2 | Topic 3 | Topic 4 | Topic 5 | Topic 6 | Topic 7 | Topic 8 | Topic 9 | Topic 10 | Topic 11 | Topic 12 | Topic 13 | Topic 14 | Topic 15 |
|---|---|---|---|---|---|---|---|---|---|---|---|---|---|---|
| fashion | retail | health | energy | energy | entertain-ment | fashion | computer | online shopping | entertain-ment | online shopping | auto | health | smart phone | food |
| size | buy | food | energy | oil | film | ugg | windows | amazon | music | ebay | car | blood | apple | chocolate |
| dress | store | weight | power | gas | movie | boots | camera | price | mix | item | vehicle | treatment | android | cheese |
| black | walmart | eat | wind | natural | series | louis | video | free | band | shipping | engine | disease | iphone | food |
| shoes | bought | diet | electricity | energy | video | vuitton | computer | buy | orginal | seller | motor | health | samsung | chicken |
| clothes | find | fat | project | production | watch | epub | system | best | album | items | fuel | patients | phone | butter |
| fashion | stuff | healthy | water | prices | story | outlet | digital | deals | song | paypal | auto | cancer | app | cup |
| white | money | organic | coal | pipeline | dvd | cheap | drive | shipping | remix | buyer | bmw | medical | ipad | cream |
| jeans | great | body | renewable | drilling | movies | shoes | sound | prices | records | auction | electric | pain | google | milk |
| leather | time | health | solar | shell | star | nike | usb | sale | feat | email | drive | medicine | tablet | sugar |
| pink | ebay | water | plant | crude | films | lauren | memory | card | hangover | feedback | ford | body | mobile | recipe |
| color | box | drink | environmental | companies | art | ralph | laptop | gift | rock | sellers | renault | hospital | galaxy | bread |
| bag | shop | protein | fuel | petroleum | music | handbags | intel | purchase | songs | days | rear | drug | apps | sauce |
| clothing | sell | meat | plants | company | fans | uggs | audio | online | radio | bid | front | liver | htc | fresh |
| jacket | price | fruit | green | billion | ent | dre | core | deal | guitar | condition | truck | heart | device | ice |
| red | better | calories | government | industry | scene | bags | asus | save | love | auctions | power | factor | windows | eat |
| style | buying | milk | clean | barrels | episode | jerseys | dvd | check | bass | contact | honda | clinical | devices | sweet |
| women | cheap | carbon | technology | shale | game | bag | software | reviews | mp3 | selling | model | stomach | nokia | mix |
| pants | target | nutrition | infrastructure | gasoline | television | coach | processor | time | live | listing | wheel | cold | blackberry | salad |
| shirt | costco | exercise | emissions | fuel | characters | kors | sony | product | orchestra | buyers | road | pressure | sony | fruit |
| wedding | sears | fitness | gas | texas | audience | chanel | power | discount | tracks | payment | miles | symtoms | smatphone | cake |

```xml
<?xml version="1.0" encoding="utf-8"?>
<TopicalCategory>
   <Category Name="Energy">
     <Description>Topics about both traditional and green
        energy</Description>
     <MatchedTopics>
        <Topic>
          <ID>4</ID>
          <Label>Green energy</Label>
          <ProbThreshold>0.20</ProbThreshold>
        </Topic>
        <Topic>
          <ID>5</ID>
          <Label>Traditional energy</Label>
          <ProbThreshold>0.30</ProbThreshold>
        </Topic>
     </MatchedTopics>
   </Category>
   <Category Name="Auto">
     <Description>Topics about cars, vehicles and their
        parts.</Description>
     <MatchedTopics>
        <Topic>
          <ID>12</ID>
          <Label>Cars and vehicles in general</Label>
          <ProbThreshold>0.35</ProbThreshold>
        </Topic>
     </MatchedTopics>
   </Category>
   <Category Name="Entertainment">
     <Description>Topics about entertainment industry</Description>
     <MatchedTopics>
        <Topic>
          <ID>6</ID>
          <Label>Movies and television</Label>
          <ProbThreshold>0.45</ProbThreshold>
        </Topic>
        <Topic>
          <ID>10</ID>
          <Label>Music</Label>
          <ProbThreshold>0.40</ProbThreshold>
        </Topic>
     </MatchedTopics>
   </Category>
</TopicalCategory>
```

FIG. 6

```xml
<?xml version="1.0" encoding="utf-8"?>
<AdHocCategory>
    <Category Name="New England Auto Show"">
        <Description>New England auto show and Boston auto show</Description>
        <LuceneQuery>"New England International Auto Show"~9 OR "Boston Auto Show"~9 OR "New England Auto Show"~9 OR "Boston Autoshow"~9 OR "New England Autoshow"~9</LuceneQuery>
        <TopicalCategories>
            <TopicalCategory>Auto</TopicalCategory>
        </TopicalCategories>
    </Category>
    <Category Name="Carbon Emissions">
        <Description>Auto carbon emissions</Description>
        <LuceneQuery>("Carbon Emissions-based Taxation" OR "Emissions-based Taxation" OR "Lower Emissions"~7 OR "Lowers Emissions"~7 OR "Emitting CO2"~7 OR "Emitted CO2"~7 OR "Emit CO2"~7 OR "Lower CO2 Emissions"~7 OR "Low-emission" OR "Low Emission" OR "Low Emissions" OR "Emissions Reduction" OR "Reduce Emissions" OR "Schadstoff-Emission"~7 OR "Emissionswerte" OR "Emissionen" OR "Reduzierung Stickoxid-Emissionen"~7) AND (car* OR model* OR vehicle* OR auto*)
        </LuceneQuery>
        <TopicalCategories>
            <TopicalCategory>Auto</TopicalCategory>
            <TopicalCategory> Green Energy</TopicalCategory>
        </TopicalCategories>
    </Category>
    <Category Name="Car Recall">
        <Description>Car recalls</Description>
        <LuceneQuery>"auto recall"~8 OR "auto recalls"~8 OR "autos recall"~8 OR "autos recalls"~8 OR "automaker recall"~8 OR "automaker recalls"~8 OR "automakers recall"~8 OR "automakers recalls"~8 OR "automobile recall"~8 OR "automobile recalls"~8 OR "automobiles recall"~8 OR "automobiles recalls"~8 OR "car recall"~8 OR "car recalls"~8 OR "cars recall"~8 OR "cars recalls"~8</LuceneQuery>
        <TopicalCategories>
            <TopicalCategory>Auto</TopicalCategory>
        </TopicalCategories>
    </Category>
</AdHocCategory>
```

FIG. 7

SYSTEMS AND METHODS FOR CLASSIFYING ELECTRONIC DOCUMENTS

CROSS-REFERENCE TO RELATED APPLICATION

This application is a continuation of U.S. patent application Ser. No. 15/069,661, filed Mar. 14, 2016, entitled "Systems and Methods for Classifying Electronic Documents, which is a continuation of U.S. patent application Ser. No. 13/839,817 filed Mar. 15, 2013, entitled "Systems and Methods for Classifying Electronic Documents," and issued as U.S. Pat. No. 9,298,814 on Mar. 29, 2016, the entire contents of which are incorporated herein by reference.

FIELD

The present disclosure relates to systems and methods for classifying electronic documents.

BACKGROUND

This section provides background information related to the present disclosure which is not necessarily prior art.

Document classification typically includes assigning documents to a category. The documents may include, for example, texts, images, music, etc. The documents may be classified according to the subject matter contained therein by content-based classification and request-based indexing. Content-based classification is classification in which the weight given to particular subjects in a document determines the class to which the document is assigned. Request-based indexing is classification in which requests from users (e.g., particular topics, etc.) influences how documents are being classified. Typical approaches to classify documents may include, for example, Naive Bayesian, support vector machines, decision tree(s), logistic regression, etc.

SUMMARY

This section provides a general summary of the disclosure, and is not a comprehensive disclosure of its full scope or all of its features.

According to one aspect of the present disclosure, a method of classifying an electronic document from an electronic media source is disclosed. The method includes generating statistical data from one or more training documents and creating a plurality of classification rules, including creating at least one topic model-based classification rule using the statistical data and creating at least one query-based classification rule using one or more user defined categories and the statistical data. The method further includes classifying the electronic document using the at least one topic model-based classification rule.

According to another aspect of the present disclosure, a non-transitory computer readable medium storing computer-executable instructions for creating a plurality of classification rules to classify an electronic document from an electronic media source is disclosed. The instructions include generating statistical data from one or more training documents and creating a plurality of classification rules, including creating at least one topic model-based classification rule using the statistical data and creating at least one query-based classification rule using one or more user defined categories and the statistical data.

According to still another aspect of the present disclosure, a computer system for classifying an electronic document from an electronic media source is disclosed. The computer system includes a communication network and a computer server in communication with the communication network. The computer server is configured to receive the electronic document via the communication network. The computer server has memory and a processor. The memory includes one or more training documents and one or more user defined categories. The processor is configured to generate statistical data from the one or more training documents and create a plurality of classification rules. The plurality of classification rules include at least one topic model-based classification rule created using the statistical data and at least one query-based classification rule created using the one or more user defined categories and the statistical data. The processor is further configured to classify the electronic document using the at least one topic model-based classification rule.

According to yet another aspect of the present disclosure, a method of classifying an electronic document from an electronic media source using at least one classification rule from a plurality of classification rules is disclosed. The classification rules include at least one topic model-based classification rule and at least one query-based classification rule. The topic model-based classification rule is created using statistical data generated from one or more training documents and the query-based classification rule is created using the statistical data and one or more user defined categories. The method includes classifying the electronic document using the at least one topic model-based classification rule.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 4 is an example topic-term matrix including topical categories employed to create the classification rules in the method of FIG. 2 and classify the electronic documents in the method of FIG. 3.

FIG. 6 is a screen shot illustrating example topic model-based classification rules in XML format created in the method of FIG. 2.

FIG. 7 is a screen shot illustrating example query-based classification rules in XML format created in the method of FIG. 2.

Corresponding reference numerals indicate corresponding parts or features throughout the several views of the drawings.

DETAILED DESCRIPTION

Figure 1:
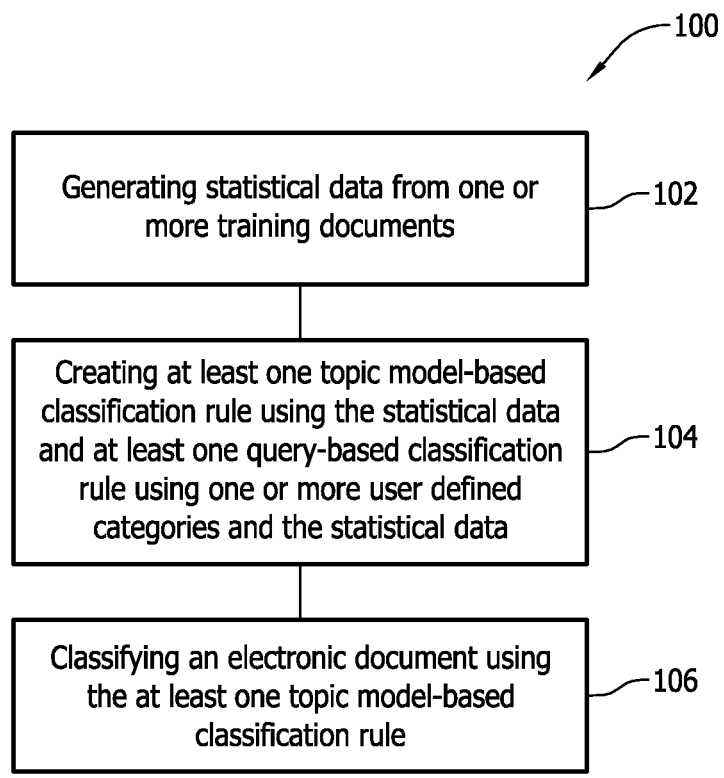
FIG. 1 is a block diagram illustrating a method for classifying an electronic document from an electronic media source according to one example embodiment of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

A method of classifying an electronic document from an electronic media source according to one example embodiment of the present disclosure is illustrated in FIG. 1 and indicated generally by reference number 100. As shown in FIG. 1, the method 100 includes, in block 102, generating statistical data from one or more training documents and, in block 104, creating classification rules. The classification rules include at least one topic model-based classification rule created using the statistical data and at least one query-based classification rule created using one or more user defined categories and the statistical data. As shown in FIG. 1, the method 100 further includes, in block 106, classifying the electronic document using the topic model-based classification rule.

By creating the classification rules using the same statistical data from the training document and the user defined categories (sometimes referred to as "ad hoc categories" or "user defined ad hoc categories"), the classification rules become focused on topics relevant to users. Because the classification rules are focused on relevant topics, classification of the electronic document using the topic model-based classification rule becomes more relevant and, in turn, data from the classified electronic document may be more effective and useful to the user.

For example, users are able to identify topical categories discussed in documents relevant to their industry, expertise, etc. and particular documents discussing their ad hoc categories related to their brand, product, etc. This allows users to identify topics and documents relevant to the users and, in turn, to utilize this information to more accurately collect data pertaining to their business, interests, etc. As a result, users may be able to monitor relevant discussions (e.g., positive and/or negative discussions regarding a product, false accusations, etc.), monitor new topics and/or issues, etc. via documents (e.g., blogs, messages, emails, etc.) representing the discussions and/or respond to disgruntled customers, alter protocols, etc. based on the discussions. This may be particularly important with the increasing popularity of social media which gives consumers a forum to share their experiences, opinions, etc. regarding products and services with other interested parties.

The topic model-based classification rule may be created by a statistical model (e.g., topic model, etc.) and the query-based classification rule may be created by a search engine model (e.g., Lucence Engine, etc.). The statistical model may generate the statistical data from a training document. For example, the statistical data may represent topics from the training document. A topic model-based classification rule is then created using the statistical data.

A query-based classification rule may be created (at least in part) by using user defined categories. For example, a user may define particular categories relevant to the user and the search engine model may then create a query-based classification rule using the statistical data (e.g., generated by the statistical model) and the user defined categories. Accordingly, the statistical model may provide relevant data to the search engine model to create the query-based classification rule. In this way, the statistical model may supplement the search engine model with statistical data to create the query-based classification rule. As a result, the classification rules become focused on topics more relevant to users.

Additionally, if both models utilize the same statistical data, the rule creating process and the classification process may become more efficient, allowing more electronic documents to be classified within a particular time period.

Alternatively, and as further explained below, the method 100 may include classifying the electronic document(s) using both the topic model-based classification rule and the query-based classification rule. By doing so, classification of the electronic document may be more effective and the resulting data from the classification may not only increase but also may be more relevant to a particular user.

Figure 2:
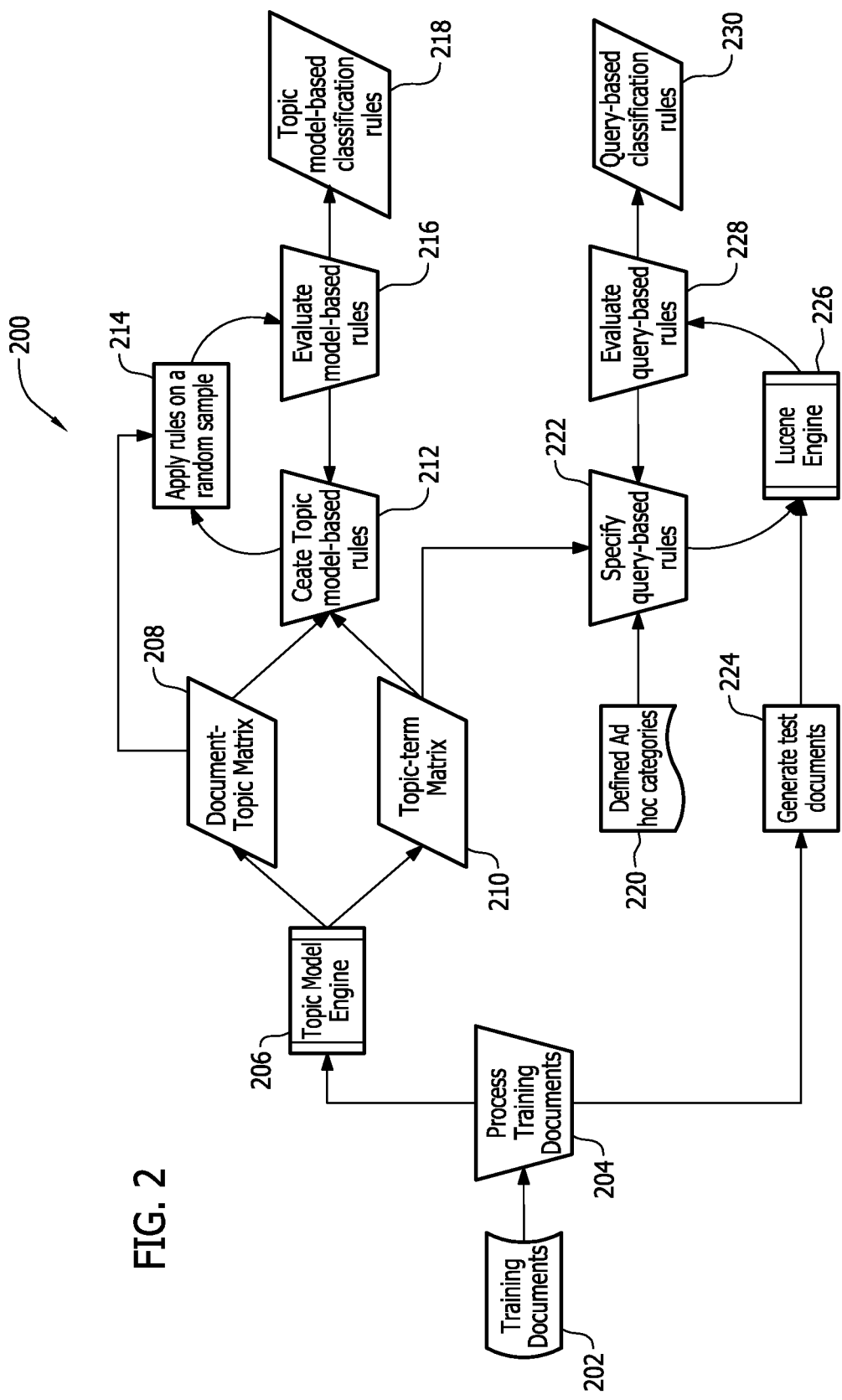
FIG. 2 is a flow diagram illustrating a method for creating one or more classification rules according to another example embodiment.

FIG. 2 illustrates an example method 200 of creating one or more classification rules. In the example of FIG. 2, the method 200 is executed offline (e.g., disconnected from a communication network). Alternatively, the method 200 may be executed online (e.g., connected to a communication network).

As shown in FIG. 2, the method 200 includes receiving training documents (block 202). In some embodiments, the training documents may include unlabeled training documents that are not previously analyzed, classified, etc. into a certain category by individuals. Accordingly, if unlabeled training documents are employed, previous knowledge about the documents may not be necessary and/or provided.

Although the example of FIG. 2 illustrates receiving multiple training documents, only one training document may be received without departing from the scope of the present disclosure. Preferably, multiple training documents are employed so that the classification rules are more reliable. Additionally, the training documents may be representative of electronic documents that will be classified based on the classification rules (further described below). This may result in more effective classification rules.

In the example of FIG. 2, the training documents are processed in block 204. For example, each training document may be filtered to clean textual content, including, for example, translating words to a desired language, stemming words to a root word, removing stop words (e.g., the, is, at, which, on, etc.) and/or low frequency words, etc. By filtering the training documents, efficiency of the statistical model and the search engine model may be increased. Alternatively, the training documents may not be processed and instead the method 200 may skip block 204 and utilize unprocessed training documents to create the classification rules.

As shown in block 206, the method 200 employs a topic model engine as the statistical model. The topic model engine receives the processed training documents (of block 204) and is able to discover topical categories discussed in the processed training documents. The number of topical categories may be preset to a constant value for each training document. The topic model engine may generate statistical data (e.g., using the topical categories) from the processed training documents. In the example of FIG. 2, the statistical data includes a document-topic matrix (shown in block 208) and a topic-term matrix (shown in block 210).

Because the topic model engine discovers the topical categories discussed in the training documents, the topical categories in the training documents do not need to be manually classified prior to inputting the training documents into the topic model engine. Accordingly, knowledge regarding potential topical categories found in the training documents may not be required in advance. Thus, unlabeled training documents (as explained above) may be employed. Additionally, because no advance knowledge regarding potential topical categories may be needed (besides the number of topical categories as explained above), the topic model engine can adapt to topical changes and discover new topical categories as needed.

In the example of FIG. 2, the topic model engine may be any suitable topic model engine including, for example, a probabilistic latent semantic indexing (PLSI) model, a latent Dirichlet allocation (LDA) model, etc.

The topic-term matrix (shown in block 210) generated from the topic model engine is a probabilistic distribution of each topical category within the processed training documents over the terms (e.g., words) in these training documents. These probabilities put a weight on each term in the training document with regard to its relevance to the topical categories. For example, a term having a higher probability value is more likely to be chosen by an author discussing a given topical category than a term having a lower probability value.

FIG. 4 illustrates an example topic-term matrix 400 that may be created by the topic model engine. In the example of FIG. 4, the topic-term matrix contains fifteen topical categories in random order (shown as Topics 1-15). A name for each topical category may be manually added based on the terms provided in a particular topical category. The names may be general so that more than one topical category has the same name. For example, as shown in FIG. 4, the Topic 4 and the Topic 5 are both named "Energy." Alternatively, the names may be specific. For example, the Topic 4 includes terms related to traditional energy and therefore may be named "Traditional Energy" and the Topic 5 includes terms related to green energy and therefore may be named "Green Energy."

For each topical category, twenty terms are provided in a column. Alternatively, more or less topical categories and/or terms may be employed. The terms are ordered according to the probability that a particular term is used when discussing a particular topical category. For clarity, the probability value for each term is not shown. For example, the term "food" has a higher probability of being used when discussing Topic 3 than the term "organic."

Referring back to FIG. 2, the document-topic matrix (block 208) generated from the topic model engine (block 206) may be a distribution of the topical categories from the topic-term matrix (e.g., shown in FIG. 4) for each training document. The prominence of a particular topical category in a document may be represented with a probability value from zero (0) to one (1). A topical category having a higher probability value means it has a higher relevance to a particular document.

Figure 5A:
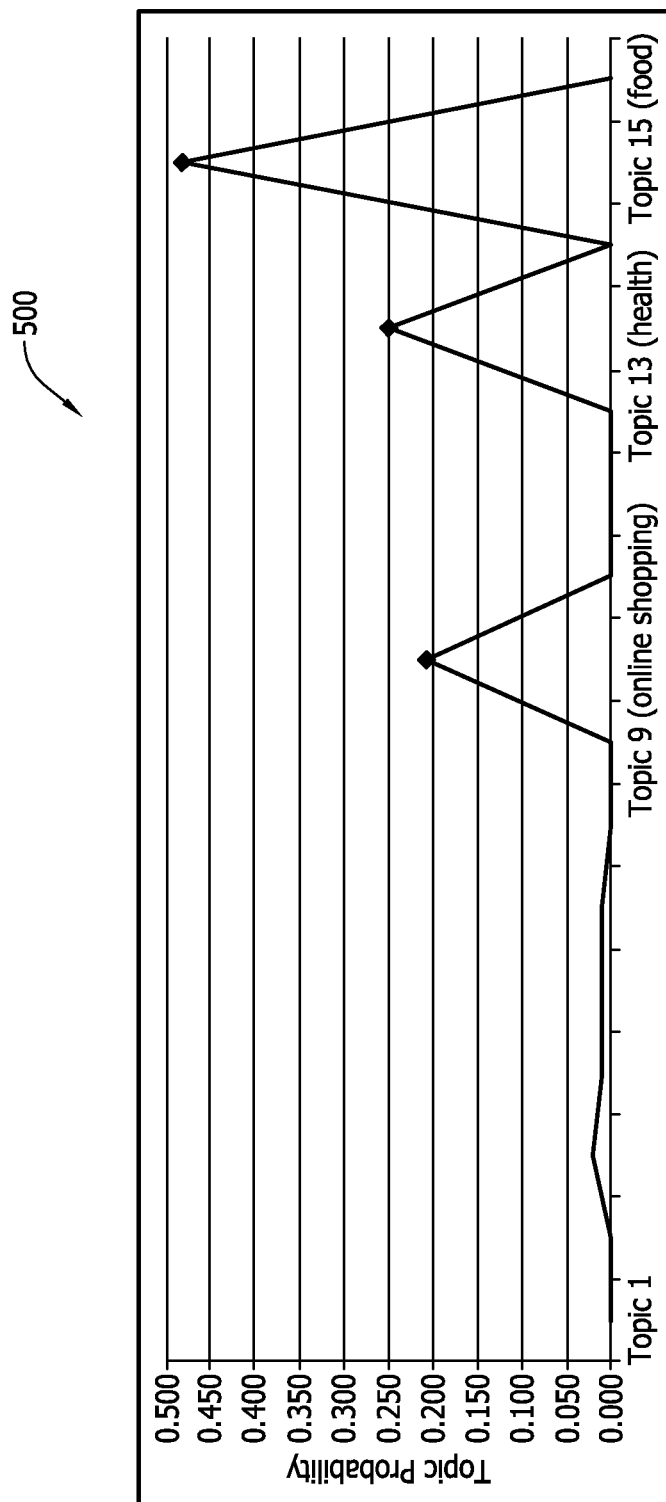
FIG. 5a is an example graph illustrating probabilities of particular topical categories of the topic-term matrix of FIG. 4 being found in an example article.
Figure 5B:
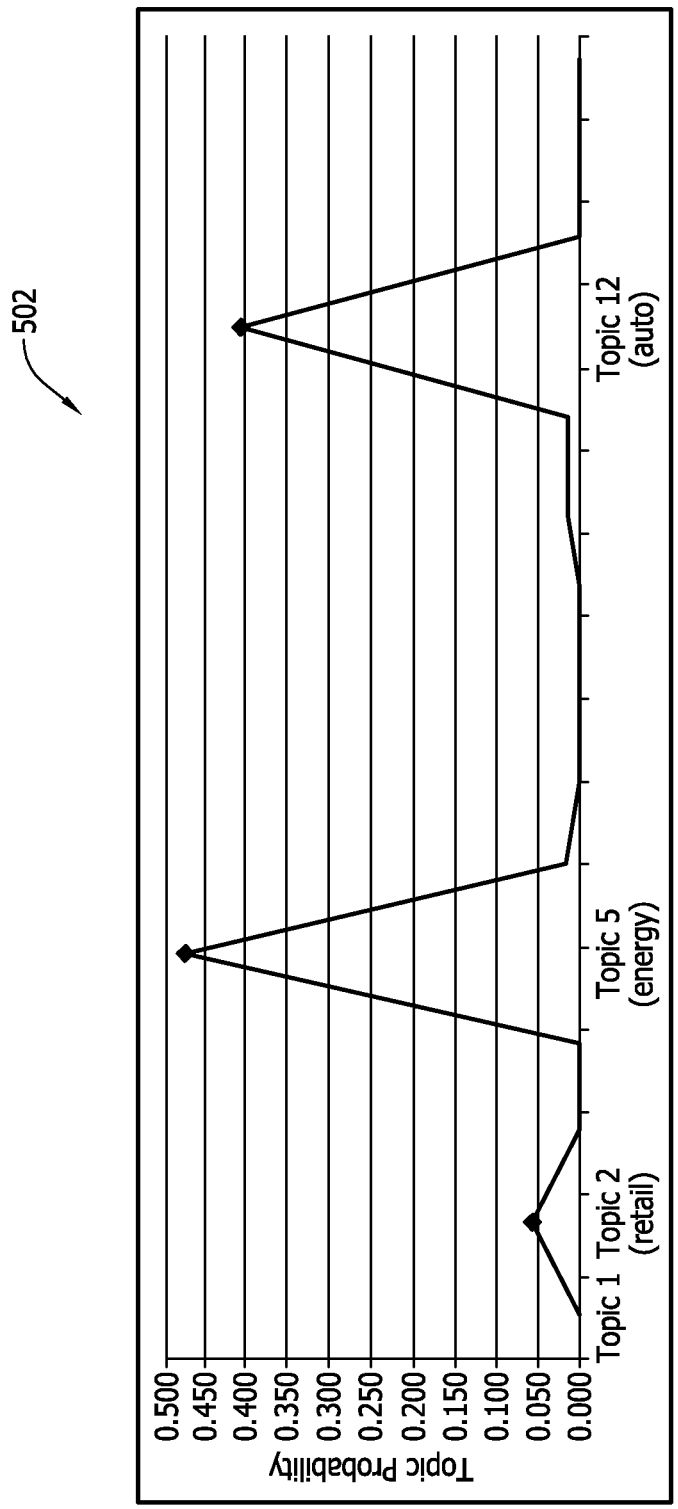
FIG. 5b is another example graph illustrating probabilities of particular topical categories of the topic-term matrix of FIG. 4 being found in another example article.

FIGS. 5a and 5b are graphs 500 and 502, respectively, representing sample document-topic matrixes generated from the topic model engine. The graphs 500, 502 illustrate probabilities of particular topical categories of the topic-term matrix of FIG. 4 being found in example documents. As shown in the example of FIG. 5a, the graph 500 illustrates a distribution of topical categories for the following example document (from, e.g., a media source):

Starbucks Via Ready Brew Coffee costs about ⅒th of the price of a cup of coffee from a Starbucks store and contains anywhere from zero calories to upwards of 100 calories, depending on the flavor you get. The portable packets make it easy to enjoy a cup of coffee anywhere! Simply pour the packet into a cup, add hot water and stir! The Ready Brew line of coffee comes in 14 different flavors, from your regular Italian Roast to Ice Caramel to French Roast! Save calories, time and money! Product Features 100% Arabica coffee only 59 cents per packet from Amazon.com! Just add hot water and stir. Available in 14 flavors. Where to buy: Ready Brew coffee is available at your nearest Starbucks or you can have them shipped to you for FREE from Amazon.com! Also check out: 3 Tips To Healthy & Delicious Coffee It's no secret that I'm a big fan of coffee!

As shown in the example of FIG. 5a, the above document includes three topical categories (from the topic-term matrix 400 of FIG. 4) having a relatively high probability. The topical categories include Topic 15 ("Food") having a probability value of about 0.475, Topic 13 ("Health") having a probability value of about 0.25, and Topic 9 ("Online Shopping") having a probability value of about 0.21. Thus, the example document is deemed relevant to the Topic "Online Shopping", more relevant to the Topic "Heath", and even more relevant to the Topic "Food."

The example graph 502 of FIG. 5b illustrates a topical category distribution of the following example document: Chrysler to sell natural gas-powered truck: Chrysler aims to be the first U.S. automaker to produce a factory-built pickup truck that is powered mainly by natural gas. The privately held company said Tuesday that its new Ram 2500 Heavy Duty CNG truck will be sold to commercial customers that operate truck fleets. The company expects to deliver the first trucks in July. The truck will have natural gas tanks and an 8-gallon fuel tank for gasoline. Chrysler said a small amount of gasoline is needed to start the truck, but after ignition it runs entirely on natural gas. If the natural gas tanks run out, the engine can switch to gasoline. Natural gas prices have dropped steeply over the last year thanks to higher production. Chrysler said the gas-powered trucks will save money over the long term.

As shown in the example of FIG. 5b, the above document includes two topical categories (from the topic-term matrix 400 of FIG. 4) having a relatively high probability. The topical categories include Topic 5 ("Energy") having a probability value of about 0.475 and Topic 12 ("Auto") having a probability value of about 0.4. Thus, this example document is deemed relevant to the Topic "Auto" and more relevant to the Topic "Energy."

Referring back to FIG. 2, the method 200 further includes (in block 212) creating one or more topic model-based classification rules based on the document-topic matrix (block 208) and the topic-term matrix (block 210). For example, the topic model-based classification rules may be created by analyzing semantics of each topical category based on relevant terms (of each topical category) having the highest probability from the topic-term matrix (block 210) and by analyzing a distribution of each topical category from the document-topic matrix (block 208). Particular topical categories may then be identified and placed into one or more categories of interest. A category of interest may include particular topical categories that may be relevant to a particular user. The category of interest may be broad (e.g., entertainment, sports, etc.) or more specific (e.g. movie, baseball, etc.). For example, if a user is interested in the entertainment industry, a category of interest may include Topic 6 ("Entertainment") and Topic 10 ("Entertainment") of the topic-term matrix of FIG. 4.

After identifying the topical categories relevant to a category of interest, one or more topic model-based classification rules may be created to assign an electronic document to the particular categories of interest. For example, a topic model-based classification rule may be "IF the probability value of Topic 6 OR Topic 10 is above a certain threshold for document A, THEN document A is assigned to the Entertainment category of interest."

The topic model-based classification rules created in block 212 may then be applied to and evaluated on one or more test documents. This is shown in blocks 214 and 216. The test documents may be randomly selected from the training documents described above. Based on the topic model-based classification rules created in block 212, each test document may be classified (e.g., assigned to a category as further explained below). This is shown in block 214.

The classification results from block 214 may be evaluated in block 216 to ensure the topic model-based classification rules are suitable. In some embodiments, an individual may analyze the text of the test documents and ensure each test document is correctly classified. The topic model-based classification rules may then be evaluated by utilizing, for example, precision and/or recall equations to ensure the topic model-based classification rules meet a defined threshold. Equations (1) and (2) below are example equations for determining precision and recall, respectively.

$$\text{Precision} = \frac{N(d_c+)}{N(d_c+) + N(d_c-)} \quad (1)$$

$$\text{Recall} = \frac{N(d_c+)}{N(d_c)} \quad (2)$$

In the example equations (1) and (2), $N(d_c+)$ is the number of test documents correctly classified to category C based on the topic model-based classification rules, $N(d_c-)$ is the number of test documents incorrectly classified to category C based on the topic model-based classification rules, and $N(d_c)$ denotes the total number of test documents that should be classified to category C based on human judgment.

If the results of the precision equation and/or the recall equation are below the defined threshold, the topic model-based classification rules may be deemed unsuitable. As a result, the topic model-based classification rules may be modified. The modified classification rules may be applied to the one or more test documents and evaluated again as explained above. This process of evaluating the topic model-based classification rules may be repeated until the topic model-based classification rules meet the defined threshold.

The topic model-based classification rules determined to be suitable may be identified and stored for future use as further explained below. For example, the topic model-based classification rules may be formatted and saved in XML files.

FIG. 6 illustrates a screen shot 600 of example topic model-based classification rules in XML format. As shown in FIG. 6, the screen shot 600 includes three topical categories (Energy, Auto and Entertainment). A description of each topical category, a list of matched topics and a probability threshold for each matched topic are shown below each topical category. For example, the Energy category includes a description of "Topics about both traditional and green energy" and has two matched topics. The matched topics include Topic 4 and Topic 5 (of FIG. 4) that refer to green energy and traditional energy, respectively. The probability threshold for Topic 4 and Topic 5 is 0.20 and 0.30, respectively. Thus, if a document has a probability value above 0.20 for Topic 4 or above 0.30 for Topic 5, the document is classified under the Energy category. Therefore, based on this topic model-based classification rule, the example document of FIG. 5*b* would be classified into the Energy category because the document includes a probability value of about 0.475 for Topic 5 (as explained above).

Referring back to FIG. 2, the method 200 further includes creating one or more query-based classification rules. In the example of FIG. 2, the method 200 employs a Lucene Engine (created by Apache Lucene™) as the search engine model to create the query-based classification rules. This is shown in block 226. Therefore, each query-based classification rule is a Boolean Lucene query defined by Lucene query grammar.

Alternatively, any suitable search engine model may be employed to create the query-based classification rules without departing from the scope of the present disclosure. For example, the method 200 may employ a Sphinx search engine, a DataparkSearch search engine, a Terrier search engine, an OpenSearchServer search engine, etc.

As shown in block 222, query-based classification rules may be created using one or more user defined ad hoc categories from block 220. For example, for each user defined ad hoc category, a query-based classification rule may be created. The user defined ad hoc categories may be created for a particular user so that the categories are relevant to that particular user. For example, a user defined ad hoc category may be about a specific product or brand, an event regarding a product (e.g., a launch, a campaign, recall, etc.), etc.

The query-based classification rules are also created using the topic-term matrix generated in block 210. In this way, relevant topics may be identified from the topic-term matrix for the query-based classification rule. Additionally, using the topic-term matrix assists in identifying terms used by authors when writing about the relevant topics.

In the example of FIG. 2, one or more test documents may be generated based on the processed training documents (block 224). In some embodiments, the document-topic matrix (block 208) and the topic-term matrix (block 210) may also be utilized to generate the test documents. For example, the document-topic matrix and the topic-term matrix may identify general topics of each training document. This information may be used to generate more relevant, targeted, etc. test documents from the training documents.

As shown in block 226, the Lucene Engine receives the query-based classification rules created in block 222 and the test documents generated in block 224. The Lucene Engine indexes and matches the test documents to the query-based classification rules. The Lucene Engine then outputs results (e.g., a relevance score) reflecting the relevance of the test documents to the user defined ad hoc categories using the query-based classification rules.

The results from the Lucene Engine may be evaluated in block 228 to ensure each query-based classification rule is suitable (e.g., meets a defined threshold). For example, the generated test documents may be analyzed by an individual and marked as relevant or irrelevant for each user defined ad hoc category (from block 220). Then, the query-based classification rule may be evaluated by utilizing precision and/or recall equations as explained above. If the results are unsuitable, the classification rule may be modified and evaluated again as explained above.

The query-based classification rules determined to be suitable may be identified and stored for future use as explained below. For example, the query-based classification rules may be formatted and saved in XML files. One example screen shot 700 of three query-based classification rules in XML format is shown in FIG. 7.

In the example of FIG. 7, the three query-based classification rules are shown as Boolean Lucene Queries ("LuceneQuery"). The screen shot 700 also includes user defined ad hoc categories (e.g., from block 220 as explained above) and relevant topical categories from the topical categories generated by the topic model engine (block 206). For example, the topical categories may be analyzed (e.g., manually by a research analyst) in view of the query-based classification rules and then relevant topical categories may be identified and saved as an element of one or more user defined ad hoc categories.

In the example of FIG. 7, the user defined ad hoc categories include "New England Auto Show," "Carbon Emissions" and "Car Recall." The relevant topical categories for "Carbon Emission" are "Auto" (Topic 12 of FIG. 4) and "Green Energy" (corresponding to Topic 4 of FIG. 4 as explained above). Therefore, only documents classified to topical categories "Auto" and "Green Energy" (as explained above with reference to FIG. 6) may be matched to the Boolean Lucene query (i.e., the query-based classification rule) for "Carbon Emissions."

Figure 3:
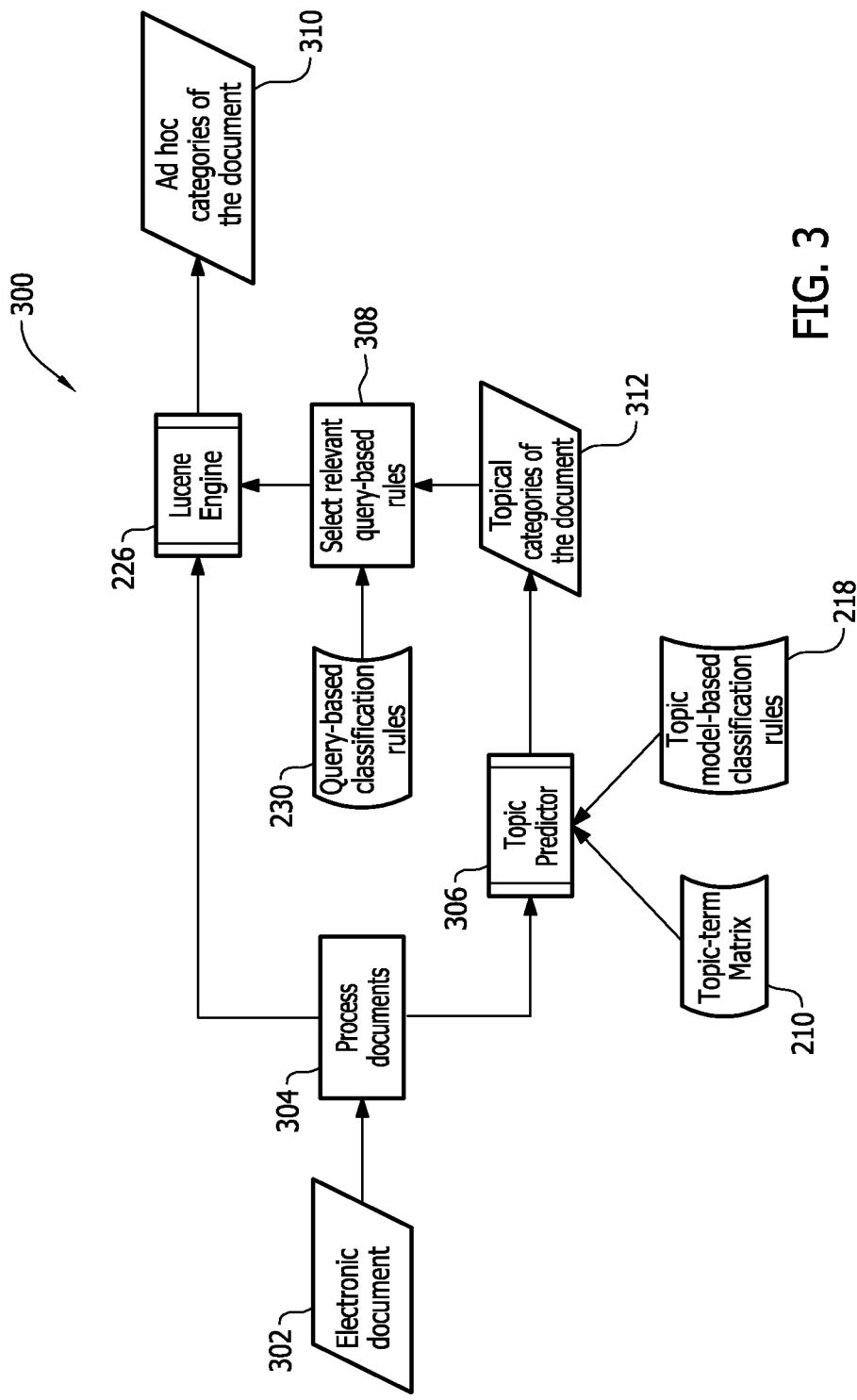
FIG. 3 is a flow diagram illustrating a method for classifying one or more electronic documents using the classification rules created in the method of FIG. 2.

FIG. 3 illustrates a flowchart of an example method 300 for classifying at least one electronic document using the topic model-based classification rules and/or the query-based classification rules created in the method 200 of FIG. 2.

As shown in FIG. 3, the method 300 includes receiving electronic documents to be classified (block 302). For example, the electronic documents may be received as streaming data. The electronic documents are then processed in block 304. For example, each electronic document may be filtered to clean textual content as explained above. Alternatively, the electronic documents may not be processed and instead the method 300 may classify unprocessed electronic documents.

In some embodiments, the electronic documents may be processed (block 304) in substantially the same manner as the training documents were processed in block 204 of FIG. 2. By processing the electronic documents in substantially the same manner, the accuracy of classifying the electronic documents may increase.

The processed electronic documents along with the topic-term matrix (block 210) and the topic model-based classification rules (block 218) created in method 200 may be provided to a topic predictor (shown in block 306). In some embodiments, the topic predictor (block 306) may be similar to the topic model engine (bock 206) of FIG. 2. However, the topic predictor may not generate statistical data (e.g., the topic-term matrix and/or the document-topic matrix) as may be done by the topic model engine of FIG. 2. Instead, the topic predictor may receive the topic-term matrix (block 210) as explained above.

In the example of FIG. 3, the topic predictor may receive the processed electronic documents from one or more other devices (e.g., servers, etc.) via a communication network (e.g., internet, intranet, etc.). In this way, the topic predictor may operate in real-time. Alternatively, the topic predictor may receive the processed electronic documents in any suitable manner including, for example, manually, via memory storing the processed electronic documents, etc.

The topic predictor may classify the processed electronic documents by assigning one or more topical categories to the electronic documents based on the topic model-based classification rules. In this way, more than one topical category may be assigned to a particular electronic document.

Alternatively, any suitable topic model engine may be employed to classify the processed electronic documents without departing from the scope of the present disclosure. For example, the method 300 may employ a probabilistic latent semantic indexing (PLSI) model, a latent Dirichlet allocation (LDA) model, etc.

The topic predictor may assign the topical categories by establishing a distribution of topical categories of a particular electronic document based on the topic-term matrix (block 210). Then, based on the established topical distribution, the topic predictor assigns at least one of the topical categories of the topic-term matrix to the particular electronic document based on the topic model-based classification rules (block 218). In this way, the method 300 classifies the electronic documents via the topic predictor.

As shown in block 312, the method 300 then outputs the assigned topical categories for the particular electronic document.

In the example of FIG. 3, the method 300 employs the Lucene Engine (shown in block 226) as used in the method 200. The Lucene Engine may be employed to classify the processed electronic documents based on the query-based classification rules stored during the method 200 explained above. Alternatively, any suitable search engine model may be employed without departing from the scope of the present disclosure. For example, the method 300 may employ a Sphinx search engine, a DataparkSearch search engine, a Terrier search engine, an OpenSearchServer search engine, etc.

In the example of FIG. 3, the Lucene Engine receives one or more relevant query-based classification rules. As shown in block 308, the relevant query-based classification rules are selected from the query-based classification rules (block 230) based on the assigned topical categories from the topic predictor (block 312). For instance, if an assigned topical category of an electronic document is "fashion" or "sport," then it may be unnecessary to check the relevance of the electronic document with query-based classification rules regarding "car recall." However, if an assigned topical category of the electronic document is "auto," then query-based classification rules related to "car recall" should be selected. In the example of FIG. 3, the relevant query-based classification rules (block 308) are selected automatically based on analysis completed when the query-based classification rules are created (e.g., during method 200). Alternatively, the relevant query-based classification rules may be selected in any suitable manner.

For example, the method 300 may identify the relevant query-based classification rules by comparing the assigned topical categories from the topic predictor (block 312) with the relevant topical categories saved as elements of the user defined ad hoc categories as explained above with reference to FIG. 7. If an assigned topical category is the same as a relevant topical category, the method 300 selects the query-based classification rules (e.g., labeled "LuceneQuery" in FIG. 7) created for the user defined ad hoc categories from which the relevant topical category is saved under. For example, if one of the assigned topical categories from the topic predictor is "Auto", the method 300 selects the query-based classification rules (shown in FIG. 7) created for the user defined ad hoc categories "New England Auto Show," Carbon Emissions" and "Car Recall" of FIG. 7. By selecting only the relevant query-based classification rules, efficiency of the classification process may improve, accuracy of the classifying electronic documents may improve (e.g., by reducing query ambiguity caused by homonym words, etc.), etc.

The Lucene Engine then may categorize the particular electronic document from block 304 into at least one specific user defined ad hoc category (from the user defined ad hoc categories) using the selected relevant query-based classification rules (from block 308). Therefore, the particular electronic document may be classified by both assigning topical categories to the particular electronic document and by categorizing the particular electronic document in specific user defined ad hoc categories in parallel.

The method 300 then outputs the specific user defined ad hoc categories for the processed electronic documents. This is shown in block 310.

For example, if the selected relevant query-based classification rules correspond to the user defined ad hoc categories "New England Auto Show," Carbon Emissions" and "Car Recall," the Lucene Engine may categorize the particular electronic document into any of the three user defined ad hoc categories if the selected relevant query-based classification rules are satisfied. The Lucene Engine then outputs the user defined ad hoc categories used to categorize the particular electronic document. These user defined ad hoc categories are known as the specific user defined ad hoc categories.

Alternatively, if the particular electronic document does not satisfy any of the selected relevant query-based classification rules, the particular electronic document may not be categorized. As a result, the particular electronic document may be classified only by assigning topical categories to the particular electronic document (as explained above). Thus, the particular electronic document is classified only based on the topic model-based classification rules.

The assigned topical categories (block 312) from the topic predictor and the specific user defined ad hoc categories, if any, (block 310) from the Lucene Engine may be employed by a user to identify topics and documents relevant to that particular user. In turn, the user may utilize this information to more accurately collect data pertaining to their business, interests, etc. As a result, the user is able to monitor relevant discussions (e.g., positive and/or negative discussions regarding a product, false accusations, etc.), monitor new topics and/or issues, respond to disgruntled customers, alter protocols, etc.

Additionally, the created topic model-based classification rules and/or the query-based classification rules disclosed herein may be modified at any time during the process, including during or after the rule creating process (e.g., method 200 of FIG. 2), during or after the electronic document classification process (e.g., method 300 of FIG. 3), etc. For example, the topic model-based classification rules and/or the query-based classification rules may be modified after a period of time (e.g., after a period of minutes, hours, days, months, etc.). This in turn allows the topic model-based classification rules and/or the query-based classification rules to more accurately reflect current topics discussed in electronic media sources.

Figure 8:
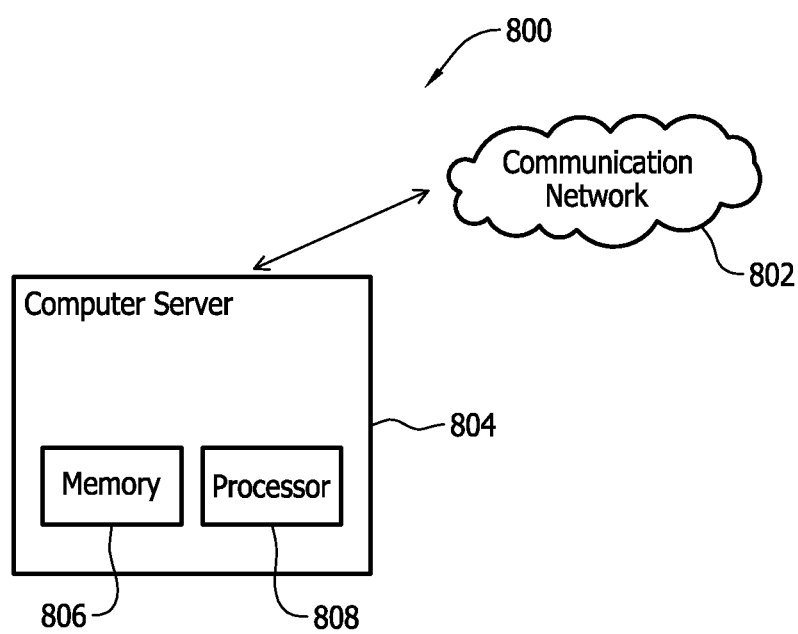
FIG. 8 is a block diagram of a system including a processor for classifying an electronic document from an electronic media source according to another example embodiment.

FIG. 8 illustrates an example computer system 800 for classifying an electronic document from an electronic media source. The computer system includes a communication network 802 and a computer server 804 in communication with the communication network 802. The computer server 804 receives electronic documents from electronic media sources via the communication network 802. In the example of FIG. 8, the computer server 804 includes memory 806 and a processor 808.

The memory 806 may include training documents and user defined ad hoc categories as described above. The memory 806 may include onboard and/or external memory, including removable and/or remote memory. For example, the memory 806 may include cloud storage, disks, DVD, CD-ROMs, ROMs, RAMs, EPROMs, EEPROMs, DRAMs, VRAMs, flash memory devices, etc.

In the example of FIG. 8, the processor 808 generates statistical data from the training documents and creates at least one topic model-based classification rule using the statistical data and at least one query-based classification rule using the user defined ad hoc categories and the statistical data. Then, the processor 808 classifies the electronic document using the topic model-based classification rule. In some examples, the processor 808 may classify the electronic document using both the query-based classification rule and the topic model-based classification rule as explained above.

Alternatively, the processor 808 may only classify the electronic document using a topic model-based classification and, if applicable, a query-based classification rule created external to the system 800. For example, the classifications rules may be created external to the system 800 (including the processor 808) and saved in XML files for future use as explained above. If desired, the XML files may be document using the topic model-based classification and, if applicable, the query-based classification rule saved in the XML files.

Additionally, although not specifically described, the processor 808 may execute any of the example methods described herein. For example, the processor 808 may evaluate the classification rules on test documents stored in the memory 806 and then modify the classification rules if needed as explained above.

Further, the example methods disclosed herein may be implemented as computer-executable instructions. These computer-executable instructions may be stored on a non-transitory computer readable medium. In this way, the methods may be implemented in a computer program product stored on a computer readable medium. The computer readable medium may include for example, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems, including molecular memory ICs, or any type of system or device suitable for storing instructions and/or data.

For example, the non-transitory computer readable medium may include instructions for generating statistical data from one or more training documents, creating at least one topic model-based classification rule using the statistical data, and creating at least one query-based classification rule using one or more user defined categories and the statistical data. The instructions stored on the non-transitory computer readable medium may then be employed in a system (e.g., the system 800) to classify an electronic document from an electronic media source.

The documents disclosed herein may include any suitable electronic document representing, for example, social media articles (e.g., a blog, a message, etc.), news articles (print or electronic), emails, etc. Additionally, the electronic media sources disclosed herein may include any suitable electronic media source including, for example, social media, news outlets, etc.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A non-transitory computer readable medium having instructions stored thereon that, when executed by at least one processor, cause the at least one processor to perform operations for creating a plurality of classification rules to classify an electronic document from an electronic media source, the operations comprising:
generating statistical data from one or more training documents, and creating a plurality of classification rules, including creating at least one topic model-based classification rule using the statistical data, the at least one topic model-based classification rule formatted as an XML file; and
creating at least one query-based classification rule using one or more user defined categories and the statistical data, the at least one query based classification rule formatted as an XML file.

2. The non-transitory computer readable medium of claim 1, the operations further comprising using a Lucene engine to create the at least one query-based classification rule.

3. The non-transitory computer readable medium of claim 2, wherein the at least one query-based classification rule is a Boolean Lucene query defined by Lucene query grammar.

4. The non-transitory computer-readable medium of claim 1, the operations further comprising using one of a Sphinx search engine, a DataparkSearch search engine, a Terrier search engine, and an OpenSearchServer search engine to create the at least one query-based classification rule.

5. The non-transitory computer readable medium of claim 1, the operations further comprising formatting the at least one topic model-based classification rule to include a probability threshold.

6. The non-transitory computer readable medium of claim 1, the operations further comprising receiving the electronic document as streaming data and processing the streaming data to obtain clean textual content.

7. The non-transitory computer readable medium of claim 6, the operations further comprising translating words in the textual content to a desired language.

8. The non-transitory computer readable medium of claim 1, the operations further comprising using one of a probabilistic latent semantic indexing (PLSI) model and a latent Direchlet allocation (LDA) model to classify the electronic document into a topical category using a topic predictor.

9. A system comprising:
a memory; and
at least one processor to:
generate statistical data from one or more training documents, and create a plurality of classification rules, including creating at least one topic model-based classification rule using the statistical data, the at least one topic model-based classification rule formatted as an XML file; and create at least one query-based classification rule using one or more user defined categories and the statistical data, the at least one query-based classification rule formatted as an XML file.

10. The system of claim 9, the at least one processor further to use a Lucene engine to create the at least one query-based classification rule.

11. The system of claim 10, wherein the at least one query-based classification rule is a Boolean Lucene query defined by Lucene query grammar.

12. The system of claim 9, the at least one processor further to use one of a Sphinx search engine, a DataparkSearch search engine, a Terrier search engine, and an OpenSearchServer search engine to create the at least one query-based classification rule.

13. The system of claim 9, the at least one processor further to format the at least one topic model-based classification rule to include a probability threshold.

14. The system of claim 9, the at least one processor further to receive the electronic document as streaming data and process the streaming data to obtain clean textual content.

15. The system of claim 14, the at least one processor further to translate words in the textual content to a desired language.

16. The system of claim 9, the at least one processor further to use one of a probabilistic latent semantic indexing (PLSI) model and a latent Direchlet allocation (LDA) model to classify the electronic document into a topical category using a topic predictor.

17. A method comprising:

generating, by at least one processor, statistical data from one or more training documents, and creating a plurality of classification rules, including creating at least one topic model-based classification rule using the statistical data, the at least one topic model-based classification rule formatted as an XML file; and creating, by the at least one processor, at least one query-based classification rule using one or more user defined categories and the statistical data, the at least one query based classification rule formatted as an XML file.

18. The method of claim 17, further comprising using a Lucene engine to create the at least one query-based classification rule.

19. The method of claim 18, wherein the at least one query-based classification rule is a Boolean Lucene query defined by Lucene query grammar.

20. The method of claim 17, further comprising using one of a Sphinx search engine, a DataparkSearch search engine, a Terrier search engine, and an OpenSearchServer search engine to create the at least one query-based classification rule.

\* \* \* \* \*